(12) United States Patent
Leggett, Jr. et al.

(10) Patent No.: US 8,599,023 B2
(45) Date of Patent: Dec. 3, 2013

(54) IDENTIFYING AND VISUALIZING ATTRIBUTES OF ITEMS BASED ON ATTRIBUTE-BASED RFID TAG PROXIMITY

(75) Inventors: Jacquelle D. Leggett, Jr., Raleigh, NC (US); Philippa M. Rhodes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/170,146

(22) Filed: Jun. 27, 2011

(65) Prior Publication Data

US 2012/0327111 A1 Dec. 27, 2012

(51) Int. Cl.
*G08B 13/14* (2006.01)
(52) U.S. Cl.
USPC .............. 340/572.1; 340/10.1; 340/10.42; 235/375
(58) Field of Classification Search
USPC ............ 340/572.1, 572.4, 10.1, 10.42, 691.6; 235/375
See application file for complete search history.

(56) References Cited

U.S. PATENT DOCUMENTS

| 7,063,256 | B2 | 6/2006 | Anderson et al. | |
|---|---|---|---|---|
| 7,372,360 | B2 | 5/2008 | Joseph | |
| 7,617,132 | B2 * | 11/2009 | Reade et al. | 705/26.61 |
| 7,639,138 | B2 | 12/2009 | Chang | |
| 7,775,430 | B2 | 8/2010 | Lin | |
| 2008/0198012 | A1 | 8/2008 | Kamen | |
| 2009/0153328 | A1 * | 6/2009 | Otani et al. | 340/572.1 |
| 2010/0262554 | A1 | 10/2010 | Elliott | |
| 2011/0202359 | A1 * | 8/2011 | Rak | 705/1.1 |

OTHER PUBLICATIONS

Rohen, "Grocery Buggy," IBM TDB, pp. 399-400, Nov. 1988, 2 pages.
Lin et al., "The Design of a Personal and Intelligent Pervasive-Commerce System Architecture," pp. 163-173, 2005, 10 pages.
Krishna et al., "A Wearable Wireless RFID System for Accessible Shopping Environments," Proc. of the ICST 3rd Int'l. Conf. on Body Area Networks, ACM, Belgium, 2008, 8 pages.
Springer et al., "RFID Enabled Systems for Quickly Locating Objects in Stores," Kimberly-Clark Corp., 2005, http://priorartdatabase.com/IPCOM/000132504, Abstract, 1 page.
RFID Waves Visualized and Demystified Using a LED Wand, Oct. 16, 2009, accessed as of Jun. 27, 2011, [online] [http://www.popsci.com/gadgets/article/2009-10/rfid-waves-vizualized-and-demystified-using-led-wand], 2 pages.

* cited by examiner

*Primary Examiner* — Toan N Pham
(74) *Attorney, Agent, or Firm* — Diana L. Roberts; Amy J. Pattillo

(57) ABSTRACT

A portable device receives a particular RFID signal identifying that a particular attribute is associated with a particular item placed proximate to the RFID tag emitting the particular RFID signal, wherein the particular RFID signal is identified from among a plurality of RFID signals, wherein a selection of the plurality of RFID signals are each associated with a separate attribute from among a plurality of attributes. The portable device displays a visual representation depicting that the particular item is associated with the particular attribute.

18 Claims, 4 Drawing Sheets

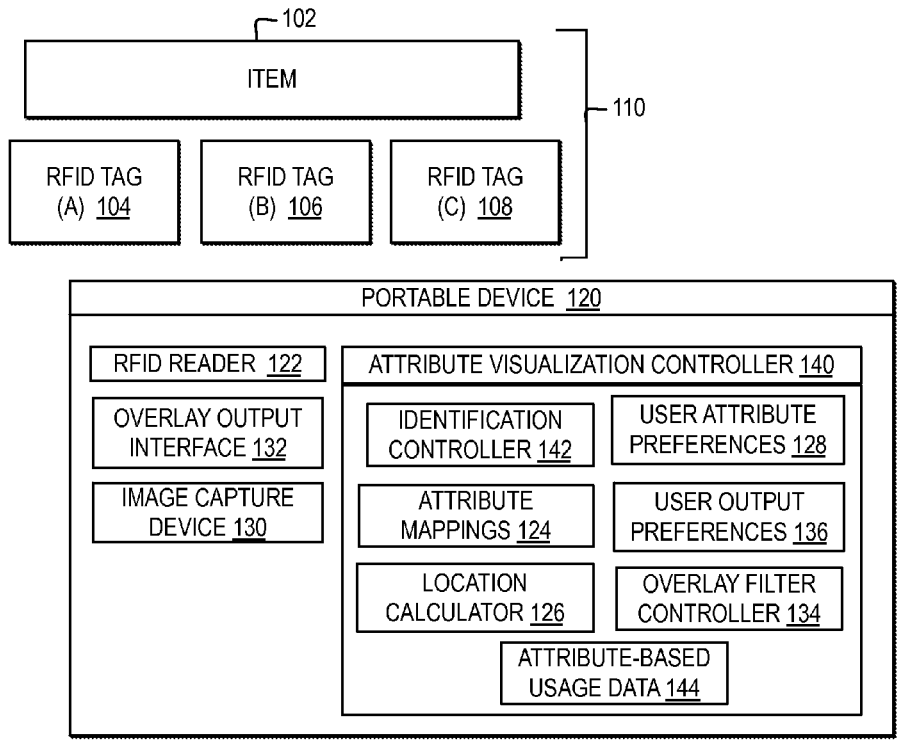
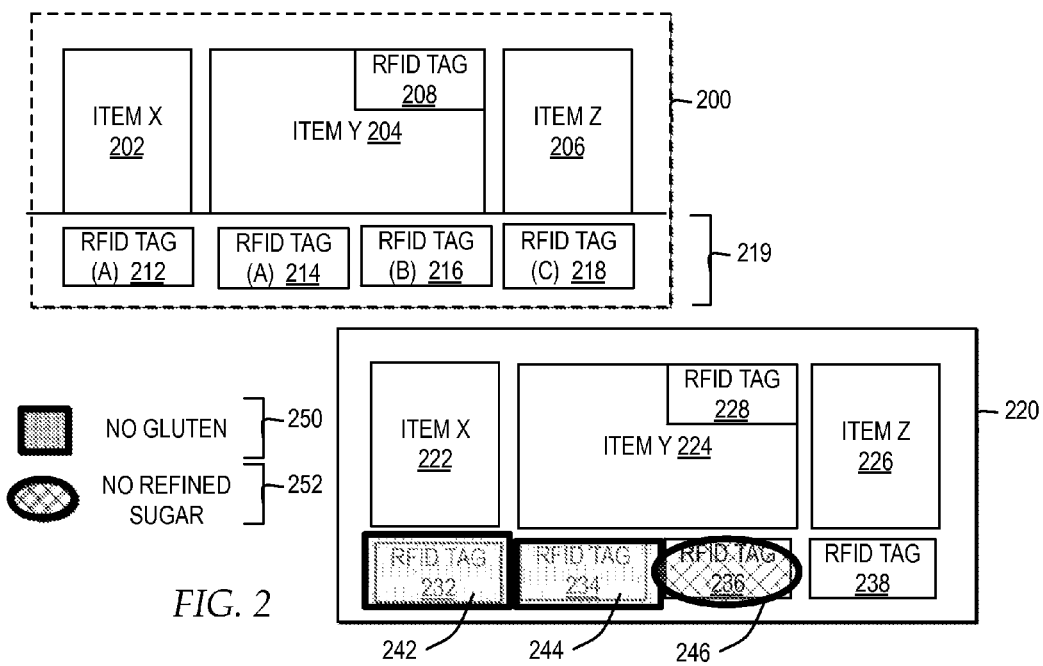
FIG. 1
FIG. 2

IDENTIFYING AND VISUALIZING ATTRIBUTES OF ITEMS BASED ON ATTRIBUTE-BASED RFID TAG PROXIMITY

BACKGROUND

1. Technical Field

This invention relates in general to data processing systems and more particularly to identifying and visualizing RFID signals identifying attributes of items positioned proximate to detected attribute-based RFID tags.

2. Description of the Related Art

When one has dietary limitations it can be tedious to sort through items in a store to identify whether items are free of particular substances or that only contain particular substances. For example, one with dietary limitations may have to sort through items in a store to find items that are gluten free, sugar free, sodium free, or nut free. The more ingredients that an item contains, the more time consuming it becomes for shoppers to pull items off shelves and read ingredient lists to identify items that meet the shopper's dietary limitations or other preferences. In addition, in other storefronts with numerous consumable or non-consumable items, it can be tedious for a shopper to sort through multiple items to find an item that has or does not have a particular attribute that the shopper prefers.

BRIEF SUMMARY

In view of the foregoing, there is a need for a method, system, and program product for assisting a user with identifying specific items within a store that meet the user's preferences from among the items currently viewable by a user within a store as the user travels through the store. In addition, there is a need for a method, system, and program for a seller to identify which of the seller's items have particular attributes and to modify which attributes are detectable within the store, all in an economically efficient manner.

In one embodiment, a method for identifying items is directed to receiving, by a computer system, a particular RFID signal identifying that a particular attribute is associated with a particular item placed proximate to the RFID tag emitting the particular RFID signal, wherein the particular RFID signal is identified from among a plurality of RFID signals, wherein a selection of the plurality of RFID signals are each associated with a separate attribute from among a plurality of attributes, by identifying an RFID signal identifier from the particular RFID signal comparing the RFID signal identifier with at least one attribute-based signal characteristic, and responsive to the RFID signal identifier matching the at least one attribute-based signal characteristic, identifying a particular attribute mapping from among a selection of attribute mappings that maps the RFID signal identifier to the particular attribute. The method is directed to displaying, by the computer system, a visual representation depicting that the particular item is associated with the particular attribute.

In another embodiment, a system for identifying items comprises a computer system operative to receive a particular RFID signal identifying that a particular attribute is associated with a particular item placed proximate to an RFID tag emitting the particular RFID signal, wherein the particular RFID signal is identified from among a plurality of RFID signals, wherein a selection of the plurality of RFID signals are each associated with a separate attribute from among a plurality of attributes. The system comprises the computer system operative to identify an RFID signal identifier from the particular RFID signal. The system comprises the computer system operative to compare the RFID signal identifier with at least one attribute-based signal characteristic. The system comprises the computer system, responsive to the RFID signal identifier matching the at least one attribute-based signal characteristic, operative to identify a particular attribute mapping from among a selection of attribute mappings that maps the RFID signal identifier to the particular attribute. The system comprises the computer system operative to display a visual representation depicting that the particular item is associated with the particular attribute.

In another embodiment, a computer program product for identifying items comprises a tangible computer-readable storage medium having program code embodied therewith. The program code is executable by a computer a particular attribute is associated with a particular item placed proximate to an RFID tag emitting the particular RFID signal wherein the particular RFID signal is identified from among a plurality of RFID signals, wherein a selection of the plurality of RFID signals are each associated with a separate attribute from among a plurality of attributes. The program code is executable by a computer to identify an RFID signal identifier from the particular RFID signal, compare the RFID signal identifier with at least one attribute-based signal characteristic, and responsive to the RFID signal identifier matching the at least one attribute-based signal characteristic, identify a particular attribute mapping from among a selection of attribute mappings that maps the RFID signal identifier to the particular attribute. The program code is executable by a computer to display a visual representation depicting that the particular item is associated with the particular attribute.

In another embodiment, RFID tags output signals with identifiers and the identifiers are each mapped to a particular attribute from among multiple assigned attributes. RFID tags are positioned proximate to items in a store, where the items have the attribute mapped to by the signal output by the RFID tag. A portable device identifies RFID signal identifiers from the signals output by RFID tags, identifies the attribute currently assigned to the RFID signal identifier, and visualizes the RFID signal identifier to identify the attribute within a display device, to assist a user in identifying items with attributes meeting the user's preferences from among the items currently within the viewing capture range of the portable device.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 is a block diagram illustrating an example of a portable device for identifying attribute-based RFID signal identifiers from RFID tags and visualizing the RFID signal identifiers within the translucent display interface to visually identify attributes of items currently viewable by a user that are placed proximate to the RFID tags;

FIG. 2 is a block diagram illustrating one example of a visual mapping of items within a user's view with attributes that match the user's preferred attributes;

DETAILED DESCRIPTION

Figure 3:
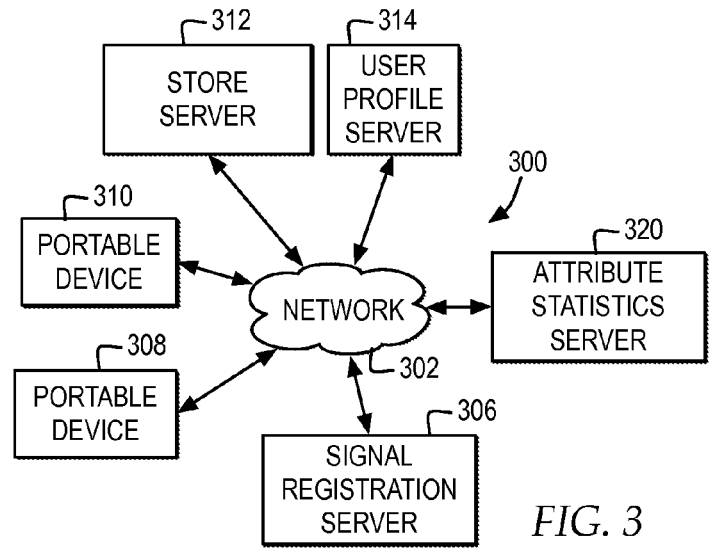
FIG. 3 is a block diagram illustrating one example of an embodiment of a distributed network environment for managing item attribute identification and visualization.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

With reference now to the Figures, and in particular with reference now to FIG. 1, a block diagram illustrates an example of a portable device for identifying attribute-based RFID signal identifiers from RFID tags and visualizing the RFID signal identifiers within the translucent display interface to visually identify attributes of items currently viewable by a user that are placed proximate to the RFID tags.

In the example, a store location 110 includes multiple items, such as item 102, with one or more reusable and repositionable, attribute-based RFID tags each currently placed proximate to one or more of the items, such as RFID tags 104, 106, and 108 placed proximate to item 102. In the example, store location 110 may include multiple types of display areas and fixtures for holding or displaying items within a store. Item 102 may represent a single physical item or multiple instances of a same product within a particular area, such as multiple loaves of a particular brand and type of bread.

In the example, RFID tags 104, 106, and 108 may be affixed to display apparatus, such as a shelf, or directly to item 102. In one example, RFID tags 104, 106, and 108 are set to a frequency that allows RFID tags 104, 106, and 108 to be read when placed behind item 102 in a display apparatus. In addition, in the example, RFID tags 104, 106, and 108 may be incorporated into a price display system proximate to item 102.

For a user to receive information about the items within a store, such as item 102, the user within the store accesses a portable device 120, wherein portable device 120 assists a user by identifying items within the store with attributes meeting a user's preferences and visualizing RFID signals identifying the preferred attributes currently viewable through portable device 120. Portable device 120 may represent one or more types of portable computing systems as described with reference to FIG. 4, including, but not limited to, a portable telephony device, a portable tablet device, and a portable image device. Portable device 120 may represent a device that is portable in that portable device 120 is carried by the user. In another example, portable device 120 may represent a device that is portable in that portable device 120 is affixed to a moveable store cart used by the user.

In the example, portable device 120 includes an RFID reader 122 for reading RFID tags, such as RFID tags 104, 106, and 108. Each of RFID tags 104, 106, and 108 may include an antenna and microchip embedded on the RFID tag. The microchip stores and processes information and modulates and demodulates a radio-frequency (RF) signal. The antenna receives and transmits a radio frequency signal. Each of RFID tags 104, 106, and 108 may be passive, having no internal power supply, semi-passive, with a small battery, or active, with its own internal power source.

In one example, RFID reader 122 is a transceiver that transmits electromagnetic waves that are received by the antenna and microchip of each RFID tag. The microchip of each RFID tag is activated by the electromagnetic wave and outputs electromagnetic waves at another frequency to send a return signal to the transceiver. The return signal may also include a copy of data embedded in the microchip. The transceiver of RFID reader 122 converts the received waves into digital data.

In the embodiment, each of RFID tags 104, 106, and 108 are described as attribute-based, set to output electromagnetic waves with a readable signal identifier, illustrated by identifiers "A", "B", or "C", which map to attributes in attribute mappings 124. In particular, RFID reader 122 reads each readable signal from RFID tags 104, 106, and 108, and may also read signals from additional RFID tags, including RFID tags that do not output attribute-based signal identifiers. RFID reader 122 converts the received waves into an RFID signal identifier, where the RFID signal identifier may identify one or more of the frequency of the signal waves and the data digitized from the wave. An identification controller 142 of an attribute visualization controller 140 of portable device 120 filters the RFID signal identifier from the RFID reader 122 to identify whether the RFID signal identifier is an attribute-based identifier and to map an attribute-based identifier to an attribute. Attribute mappings 124 include at least one attribute-based signal characteristic for identifying whether an RFID signal identifier is an attribute-based identifier. In addition, attribute mappings 124 include at least one assignment of an attribute-based identifier to an attribute, for mapping attribute-based identifiers to attributes.

In one embodiment, each of RFID tags 104, 106, and 108 are attribute-based and also item-independent RFID tags. In one example, RFID tags 104, 106, and 108 are attribute-based RFID tags because each of the RFID tags 104, 106, and 108 outputs a signal with an attribute-based identifier that maps to an attribute in attribute mappings 124. In addition, in one example, RFID tags 104, 106, and 108 are item-independent because the RFID tags are positionable proximate to items that have the attribute mapped to by the attribute-based signals output by each RFID tag, to identify attributes of items currently positioned proximate to the RFID tags, regardless of whether the RFID tags output data specific to any particular item. In the example, RFID tags 104, 106, and 108 are currently positioned proximate to item 102 and identify attributes of item 102, however each of RFID tags 104, 106, and 108 identify attributes based on positional proximity to an item, therefore each of RFID tags 104, 106, and 108 is item-independent and may be individually repositioned proximate to a different item, to identify the same attributes in that different item.

By implementing attribute-based, item-independent RFID tags, a seller may reuse and reposition the RFID tags throughout a store as store displays change. In one example, a seller may have inventory of multiple RFID tags set to a readable attribute-based identifier of "A", as described with reference to RFID tag 104, and place the RFID tags with a readable attribute-based identifier of "A" proximate to items within the store that have the attribute mapped to the readable attribute-based identifier of "A". The seller may move the RFID tags set to a readable attribute-based identifier of "A" to different locations within the store, proximate to different items, as display positions of items change.

In addition, by implementing attribute-based, item-independent RFID tags, a seller may customize the mapping of attribute-based identifiers to attributes in attribute mappings 124. In one example, a seller may reset a particular attribute-based identifier to map to a new or different attribute in attribute mappings 124. In another example, a seller may add a new attribute-based identifier to map to a new or different attribute in attribute mappings 124.

In another embodiment, RFID tags 104, 106, and 108 may be used in an item-independent manner, but RFID tags 104, 106, and 108 may output signals with item-specific or brand specific data, in addition to an attribute-based identifier. For example, RFID tags 104, 106, and 108 may be programmed with item or brand specific data, but also include an attribute-based identifier, and be reusable across one or more items.

Attribute mappings 124 may be specified by one or more of a user, a store, a group of stores, a governing entity, and a standards committee. In one example, attribute mappings 124 include a universal, standards-based mapping of standardized attribute-based identifiers to standardized attributes. In another example, attribute mappings 124 include one or more sets of mappings of attribute-based identifiers specific to the RFID tags used in a particular store mapped to standardized attributes and attributes selected by the store and further specified for one or more locations. Identification controller 142 may access a current location of portable device 120 and select a particular set of mappings for attribute mappings 124 based on the sets of mappings specified for a current location.

The attribute-based signal characteristics set in attribute mappings 124 for identifying which RFID signal identifiers are attribute-based identifiers may be set to one or more types of frequencies or one or more types of data and may be specified by store, by item, by region, or by other criteria. For example, an attribute-based signal characteristic may be set to a specific frequency, such that any RFID signals of the specific frequency detected by RFID reader 122 are filtered as attribute-based identifiers. In another example, an attribute-based signal characteristic may be set to a specific identifier, such as a specific number or word, such as "ATTR" in the data to identify an attribute-based identifier.

In one example, RFID tags 104, 106, and 108 are programmed with readable attribute-based identifiers specified by the frequency of the signal output by each tag. For example, each of RFID tags 104, 106, and 108 may each be set to output electromagnetic waves at different frequencies, when each tag is activated by an RFID reader, such as RFID reader 122. RFID reader 122 reads the signal from an RFID tag and generates an RFID signal identifier with a read frequency to identification controller 142. Identification controller 142 identifies that the particular frequency in the RFID signal identifier read matches an attribute-based signal characteristic in attribute mappings 124 and maps the particular frequency to an attribute based on a mapping for the frequency specified in attribute mappings 124. For example, as illustrated, the RFID tags are set to return waves of "frequency A" for RFID tag 104, "frequency B" for RFID tag 106, and "frequency C" for RFID tag 108, where "frequency A", "frequency B", and "frequency C" each represent a different frequency setting electromagnetic waves output by each of the RFID tags. For example, each of "frequency A", "frequency B", and "frequency C" may represent low frequencies within the 125 KHz to 134 KHz frequency band, each set to a different frequency, to implement RFID tags that can be read within a 1.5 foot radius or may represent high frequencies within the 13.553 MHz to 13.567 MHz frequency band, each set to a different frequency, to implement RFID tags that can be read within a three foot radius.

In another example, RFID tags 104, 106, and 108 are programmed with readable attribute-based identifiers specified by the data in the signal output by each tag. For example, each of RFID tags 104, 106, and 108 may be set to output electromagnetic waves with readable data representing an attribute-based identifier, such as a number, a word, or other identifier, when an RFID reader, such as RFID reader 122, activates each tag. For example, as illustrated, the RFID tags are set to return waves with data of "A" for RFID tag 104, data of "B" for RFID tag 106, and data of "C" for RFID tag 108. RFID reader 122 reads the signal from an RFID tag and generates an RFID signal identifier with read data to identification controller 142. Identification controller 142 identifies that data in the RFID signal identifier matches an attribute-based signal characteristic in attribute mappings 124 and maps the data to an attribute based on a mapping for the data specified in attribute mappings 124. In another example, the data "A" may also be implemented by using a number, word, or other identifier that is mappable to an attribute. In addition, the data "A" may also be implemented by using the name of a particular attribute. In another example, RFID tags 104, 106, and 108 may be programmed with readable signals that specify attribute-based identifiers and other item-independent identifiers, such as a sale identifier.

In one embodiment, in addition to identification controller 142 detecting an attribute-based identifiers and mapping the signal frequency or digital data in the attribute-based identifier to an attribute according to attribute mappings 124, identification controller 142 filters the attribute to only visualize currently identified attributes that match preferred attributes in user attribute preferences 128. User attribute preferences 128 may include attribute preferences of selected attributes from among multiple detectable attributes, where the attribute preferences may represent dietary restrictions, dietary preferences, or other types of preferences. User attribute preferences 128 may be specified for one or more users and may be specified by store, aisle, or other location.

To visualize attributes of items, portable device 120 includes an image capture device 130 that captures a single image or real-time video of an area viewable by image capture device 130, readable by attribute visualization controller 140. In addition, to visualize attributes of items, an overlay filter controller 134 of attribute visualization controller 140 detects the viewable area captured by image capture device 130 and identifies, through the location coordinates calculated by a location calculator 126 of attribute visualization controller 140, within the viewable area, the location of the RFID tags outputting RFID signal identifiers including attribute-based identifiers mapped to attributes preferred by the user. Next, an overlap filter controller 134 of attribute visualization controller 140 generates images for output within an overlay output interface 132, overlaying the selected RFID tags within an overlay output interface 132, to visualize the locations of the selected RFID tags and the items proximate to the selected RFID tags and visualize the attributes through characteristics of the image attributes. In one example, each type of attribute may be assigned a different hue, pattern type, shape type, or other graphical attribute. User output preferences 136 may specify the output preferences for a particular user, for the images generated for output within overlay output interface 132.

In one example, attribute visualization controller 140 includes location calculator 126 for calculating location coordinates of the RFID tags emitting signals with attribute-based identifiers mapping to attributes preferred by the user. In one example, location calculator 126 may estimate the position of an RFID tag emitting a particular signal by analyzing the signal wavelength and other characteristics of the signal. In another example, location calculator 126 may estimate the position of an RFID tag emitting a particular signal by analyzing the image captured by image capture device 130 to identify the position of RFID tags identified by a particular graphical pattern printed on attribute-based signal RFID tags and analyzing the signals emitted by the identified RFID tags to identify the originating RFID tag for each signal. In another example, location calculator 126 may estimate the position of an RFID tag emitting a particular signal by analyzing the direction or angle of the signal, by detecting an LED light turned on from the RFID tag when the tag is read through an image capture device 130, and by matching a signal to an LED light. In one example, RFID tags 104, 106, and 108 may each include an LED light that is powered on when RFID reader 122 reads each tag. In addition, RFID tags 104, 106, and 108 may include LED lights of a particular hue, identifying that the RFID tags emit attribute-based signals or may include LED lights of different hues, where the hue of the LED light of an RFID may also identify the attribute mapped to an attribute-based identifier in the RFID signal. In additional or alternate embodiments, location calculator 126 may detect additional or alternate signals, images, and other data and estimate the position of RFID tags using additional or alternate types of location analysis methods.

In the embodiment, overlay output interface 132 may include multiple types of translucent interfaces and other types of interfaces. In one example, overlay output interface 132 is a viewable screen, wherein the viewable screen provides an interface for output by overlay filter controller 134 of the image currently captured by image capture device 130 with the RFID graphical visualization images overlaid on the output image. In another example, overlay output interface 132 is a pair of interactive goggles, wherein the goggles include a transparent screen which provides an interface for output by overlay filter controller 134 of the RFID graphical visualization images overlaid in the transparent screen on the RFID tags visible by the user through the goggles.

By overlaying images in overlay output interface 132 identifying the RFID tags identifying attributes preferred by the user, portable device 120 effectively generates and outputs a visual mapping of the locations of particular items, within the user's view, that have preferred attributes, where the particular items are placed proximate to the identified RFID tags. As the user travels through a store or other area displaying items tagged by attribute-based RFID tags and the user's view changes, the visual mapping of the locations of items with attributes that match the user's preferred attributes also changes.

As a portable device 120 is used by a user within a store or other area, identification controller 142 may track attribute-based usage data 144 and share attribute-based usage data 144 according to sharing preferences set in user output preferences 136. In one example, identification controller 142 may count a number of times each attribute is mapped to in attribute-based usage data 144. In another example, identification controller 142 may store a record of user selections of user attribute preferences 128 in attribute-based usage data 144. A user may select to view the attribute-based usage data via overlay output interface 132. In addition, a user may select, in user output preferences 136, to select to share the attribute-based usage data, user attribute preferences 128, and other information, with one or more entities via a network.

As described herein, an attribute may describe one or more characteristics of an item or may describe one or more characteristics that are absent in an item. As described herein, attributes of consumable items may specify ingredients found in the consumable items and attributes of consumable items may specify ingredients absent from the consumable items. While examples described herein are made with reference to food items and with reference to consumable attributes, the items referred to herein may also represent non-food items and non-consumable attributes. Any entity may define attributes of any type of item and may specify the mapping of RFID signal identifiers to defined attributes in attribute mappings 124.

In one example of non-consumable items and non-consumable attributes, items may include hardware, such as nails, in a hardware store, where the different types of nails are made from different types of materials, such as asphalt, copper, and steel, and have different types of head attributes, such as broadhead, flathead, and no head. In the example, the attributes identified by RFID tags placed proximate to each of the types of bolts identify one or more of the material attribute and the head attribute of the nails.

In another example of a non-consumable items and non-consumable attributes, items may include supplies, such as pens, in an office supply store, where the different types of pens have different line width attributes, such as 0.25 mm, 0.5 mm, 1 mm, and 2 mm. In the example, the attributes identified by RFID tags placed proximate to each of the types of pens identify the line width attribute of the pen.

While in the embodiment, attribute visualization controller 140 is illustrated within portable device 120, in another example, one or more components of attribute visualization controller 140 may be implemented by RFID reader 122 or another component of portable device 120. For example, one or more functions of location calculator 126 may be implemented by RFID reader 122 or another component of portable device 120. In addition, while in the embodiment attribute visualization controller 140 is illustrated within portable device 120, in another example, one or more components of attribute visualization controller 140 may be implemented on or accessed from another system communicatively connected to portable device 120 via a network connection. Further, while in the embodiment a single instance of attribute visualization controller 140 is illustrated, in other embodiments, multiple instances of attribute visualization controller 140 may be implemented in portable device 120, each specified for a seller or other entity, through the customization of attribute mappings 124 and other components of attribute visualization controller 140.

In addition, while in the embodiment a single RFID reader 112 is illustrated reading three RFID tags, in other embodiments, multiple RFID readers may attempt to read the same tags at the same time or multiple tags may be condensed in a single area, creating a dense RFID network. One skilled in the art will appreciate that one or more collision avoidance protocols may be implemented within RFID readers and RFID tags to avoid collisions within dense RFID network areas.

With reference now to FIG. 2, a block diagram illustrates one example of a visual mapping of items within a user's view with attributes that match the user's preferred attributes.

In the example, a store area 200 is physically located within a store or other physical location and illustrates the bounds of the current image area 220 that is captured by image capture device 130 of a particular user's portable device 120. As previously noted, the portion of the displayed items within a store that is within the bounds of current image area 200 may change as the user travels through the store.

In the example, store area 200 includes multiple physical items, illustrated in the example as item X 202, item Y 204, and item Z 206. In addition, store area 200 includes a shelf 219, upon which the items area displayed.

In addition, in the example, store area 200 includes multiple attribute-based RFID tags currently positioned proximate to one or more items along shelf 219. For example, RFID tag 212 is positioned proximate to item X 202, RFID tags 214 and 216 are positioned proximate to item Y 204, and RFID tag 218 is positioned proximate to item Z 206. In the example, RFID tags 212 and 214 both output a signal with an attribute-based identifier for the attribute mapped to "A", RFID tag 216 outputs a signal with an attribute-based identifier for the attribute mapped to "B", and RFID tag 218 outputs a signal with an attribute-based identifier for the attribute mapped to "C".

In the example, an attribute of "no gluten", meaning the absence of gluten, is mapped to the attribute-based identifier of "A" output in the signals from RFID tags 212 and 214. In addition, an attribute of "no refined sugar", meaning the absence of refined sugar, is mapped to the attribute-based identifier of "B" output in the signal from RFID tag 216. An attribute of "no dairy", meaning the absence of any dairy products, is mapped to the attribute-based identifier of "C" output in the signal from RFID tag 218.

In addition, in the example, an RFID tag 208 affixed to item Y 204 is not an attribute-based RFID tag. The RFID signal identifier read from RFID tag 208 does not match an attribute-based signal characteristic and the signal identifier does not map to an attribute.

In the example, current image area 220 represents the area controlled within overlay output interface 132. In the example, each of the physical items in store area 200, including item X 202, item Y 204, and item Z 206, are reflected in current image area 220 by images illustrated as item X 222, item Y 224, and item Z 226. In addition, in the example, each of the physical RFID tags in store area 200, including RFID tag 212, RFID tag 214, RFID tag 216, RFID tag 218, and RFID tag 208, are reflected in current image area 200 by images illustrated as RFID tag 232, RFID tag 234, RFID tag 236, RFID tag 238, and RFID tag 228, respectively.

In the example, current image area 220 also includes image overlays 242, 244, and 246, which are positioned within current image area 220 within overlay output interface 132 to overlay the RFID tags that output a signal with an attribute-based identifier mapping to user preferred attributes, with a graphical image identifying and visualizing the mapped to attribute. In the example, the user specifies in user attribute preferences 128 a preference to view items with attributes of "no gluten" as illustrated at reference numeral 250 and of "no refined sugar" as illustrated at reference numeral 252. In addition, the user specifies in user output preferences 136 a preference to view items with attributes of "no gluten" through a rectangular, transparent shade filled graphical overlay image as illustrated at reference numeral 250 and of "no refined sugar" through an oval, transparent crosshatch filled graphical overlay image as illustrated at reference numeral 252. The user has not indicated a preference for visualizing items with the attribute of "no dairy", therefore even though RFID tag 218 outputs a signal with an attribute-based identifier that maps to "no dairy", the user has indicated a preference not to have the attribute of "no dairy" visualized within current image area 220.

As to the visualization of the "no gluten" attribute preferred by the user, in the example, image overlays 242 and 244 are placed using the rectangular image type specified for "no gluten" as indicated at reference numeral 250, to reflect the RFID tags mapping to the attribute of "no gluten", wherein the images of RFID tag 232 and RFID tag 234 are still visible through image overlays 242 and 244. In addition, in the example, as to the visualization of the "no refined sugar" attribute preferred by the user, in the example, image overlay 246 is placed using the oval image type specified for "no refined sugar" as indicated at reference numeral 252, to reflect the RFID tag mapping to the attribute of "no refined sugar", wherein the image of RFID tag 236 is still visible through image overlay 246.

Based on the proximity of the image of item X 222 to image overlay 242 and the proximity of the image of item Y 224 to image overlays 244 and 246, the attributes of each of item X 222 and item Y 224 are visualized within current image area 220. Although image overlays 242, 244 and 246 are illustrated of similar size, image overlays may vary in size and may vary in placement position. By visualizing the attributes of items within a user's view based on the attribute-based signal read from an attribute-based RFID tag positioned proximate to the item, a customized mapping of items based on attributes is provided for the user, without requiring each item to be individually tagged with an RFID and without requiring the data stored on any particular RFID tag to be specified for a particular item. In addition, by visualizing attributes of items within a user's view based on the attribute-based signal read from an attribute-based RFID tag currently positioned proximate to the item, each user's portable device bears the performance load of identifying and visualizing item attributes within a store, with minimal bearing on a store's server. Further, by visualizing attributes of items within a user's view based on the attribute-based signal read from an attribute-based RFID tag currently positioned proximate to the item, as the attributes preferred by a particular user change a user only need update user attribute preferences 128 and as the attributes identified in a store change as new products are released, portable device 120 only needs an update of the mappings identified in attribute mappings 124.

In the example, portable device 120 may read a signal from RFID tag 208, and other tags which output signals that do not include attribute-based identifiers. Portable device 120 may select to output data read from the signal output 120 within current image area 220 or within another output interface of portable device 120, according to the type of data output in the signal from RFID tag 208. In addition, portable device 120 may limit output within current image area 220 to only image overlays visualizing mapped to attributes.

With reference now to FIG. 3, a block diagram illustrates one example of an embodiment of a distributed network environment for managing item attribute identification and visualization. In the example, in a network environment 300, a network 302 communicatively connects multiple systems, such as signal registration server 306, portable device 308, portable device 310, store server 312, user profile server 314, and an attribute statistics server 320. Network 302 may include, but is not limited to, packet-switching networks, such as the Internet or an intranet, and telephony networks. In addition, network 302 may include routers, switches, gateways and other hardware to enable a communication channel between systems communicatively connected to network 302. Further, while signal registration server 306, store server 312, user profile server 314, and attribute statistics server 320 are described with reference to servers, each of the servers may be implemented within a distributed system, grid environment, cloud environment, or other distributed, on-demand system.

In the example, portable devices 308 and 310 may represent portable devices such as portable device 120 described in FIG. 1. Portable devices 308 and 310 may access, implement, or receive updates to one or more components of attribute visualization controller 140 from one or more of signal registration server 306, store server 312, user profile server 314, and attribute statistics server 320.

In the example, signal registration server 306 maintains a current, standardized list of attribute-based signal characteristics and of mappings of attribute-based identifiers to attributes, for updating attribute mappings 124 for each of portable devices 308 and 310. In addition, signal registration server 306 may provide one or more components of attribute visualization controller 140, configurable based on the standardized mappings, for any seller, for access by portable devices 308 and 310. For example, a government agency may establish a selection of standardized attributes and may establish standardized RFID tag attribute-based signals to map the to the standardized attributes.

In the example, store server 312 may provide a current mapping table for updating attribute mappings 124 at portable devices 308 and 310, where store server 312 specifies attribute-based signal characteristics and mappings of attribute-based identifiers to attributes for particular store, group or brand. In addition, store server 312 may provide attribute visualization controller 140, specified for the store, for access by portable devices 308 and 310.

In the example, user profile server 314 may store user attribute preferences 128 or user output preferences 136 in user-authorized accounts and provide access to portable devices 308 and 310 to the user preferences where the user of portable device 308 or portable device 310 has access to the user-authorized accounts.

In addition, in the example, an attribute statistics server 320 collects information about attribute-based preferences and attribute-based usage from one or more portable devices, such as portable device 308 and portable device 310. As previously described, a user may specify, in user output preferences 136, the user's preference for how attribute-based usage data 144 can be shared with an entity, which entities attribute-based usage data 144 can be shared with, and when attribute-based usage data 144 can be shared. Store server 312 may collect attribute-based usage data 144 from portable devices 308 and 310, such as collecting information about what attributes users specify in user attribute preferences 128 and collecting the number of items a particular attribute is mapped to during each user shopping experience. Attribute statistics server 320 may also collect attribute preferences specified by users, as collected by store server 312, user profile server 314, or directly from portable devices 308 and 310. Attribute statistics server 320 may identify, from collecting attribute-based usage data 144, including user attribute preferences, from multiple users, trends in attribute preferences. For example, attribute statistics server 320 may detect, from collected user attribute preferences, that a new attribute, specified by users, but not available in most stores, is becoming preferred in a particular region, city, or other area. In another example, attribute statistics server 320 may detect, from collected user attribute preferences, that a particular combination of attributes are often set together by users, and predict preferred attribute combinations. Users, sellers, and other entities may subscribe to the statistics generated by attribute statistics server 320 and may access a filtering interface, for specifying statistics filtering preferences, through a browser, application, or other software interface at a system communicatively connected to attribute statistics server 320 through network 320.

Figure 4:
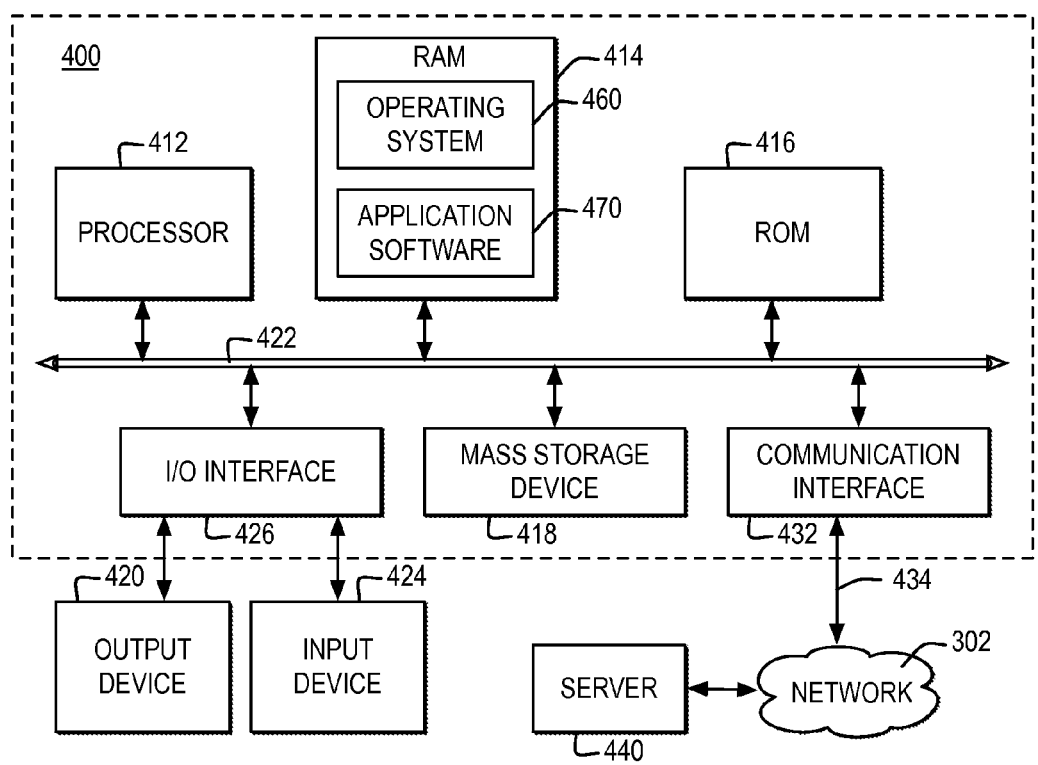
FIG. 4 is a block diagram illustrating one example of a computer system in which the present invention may be implemented.

FIG. 4 illustrates one example of a computer system in which the present invention may be implemented. The present invention may be performed in a variety of systems and combinations of systems, made up of functional components, such as the functional components described with reference to computer system 400 and may be communicatively connected to a network, such as network 302. In one example, each of portable device 120, signal registration server 306, portable device 308, portable device 310, store server 312, user profile server 314, and attribute statistics server 320 may implement one or more of the functional components described with reference to computer system 400.

Computer system 400 includes a bus 422 or other communication device for communicating information within computer system 400, and at least one hardware processing device, such as processor 412, coupled to bus 422 for processing information. Bus 422 preferably includes low-latency and higher latency paths that are connected by bridges and adapters and controlled within computer system 400 by multiple bus controllers. When implemented as a server or node, computer system 400 may include multiple processors designed to improve network servicing power. Where multiple processors share bus 422, additional controllers (not depicted) for managing bus access and locks may be implemented.

Processor 412 may be at least one general-purpose processor such as IBM® PowerPC® (IBM and PowerPC are registered trademarks of International Business Machines Corporation) processor that, during normal operation, processes data under the control of software 750, which may include at least one of application software, an operating system, middleware, and other code and computer executable programs accessible from a dynamic storage device such as random access memory (RAM) 414, a static storage device such as Read Only Memory (ROM) 416, a data storage device, such as mass storage device 418, or other data storage medium. Software, including operating system 460 and application software 470, may include, but is not limited to, code, applications, protocols, interfaces, and processes for controlling one or more systems, including, but not limited to, portable device 120.

Figure 8:
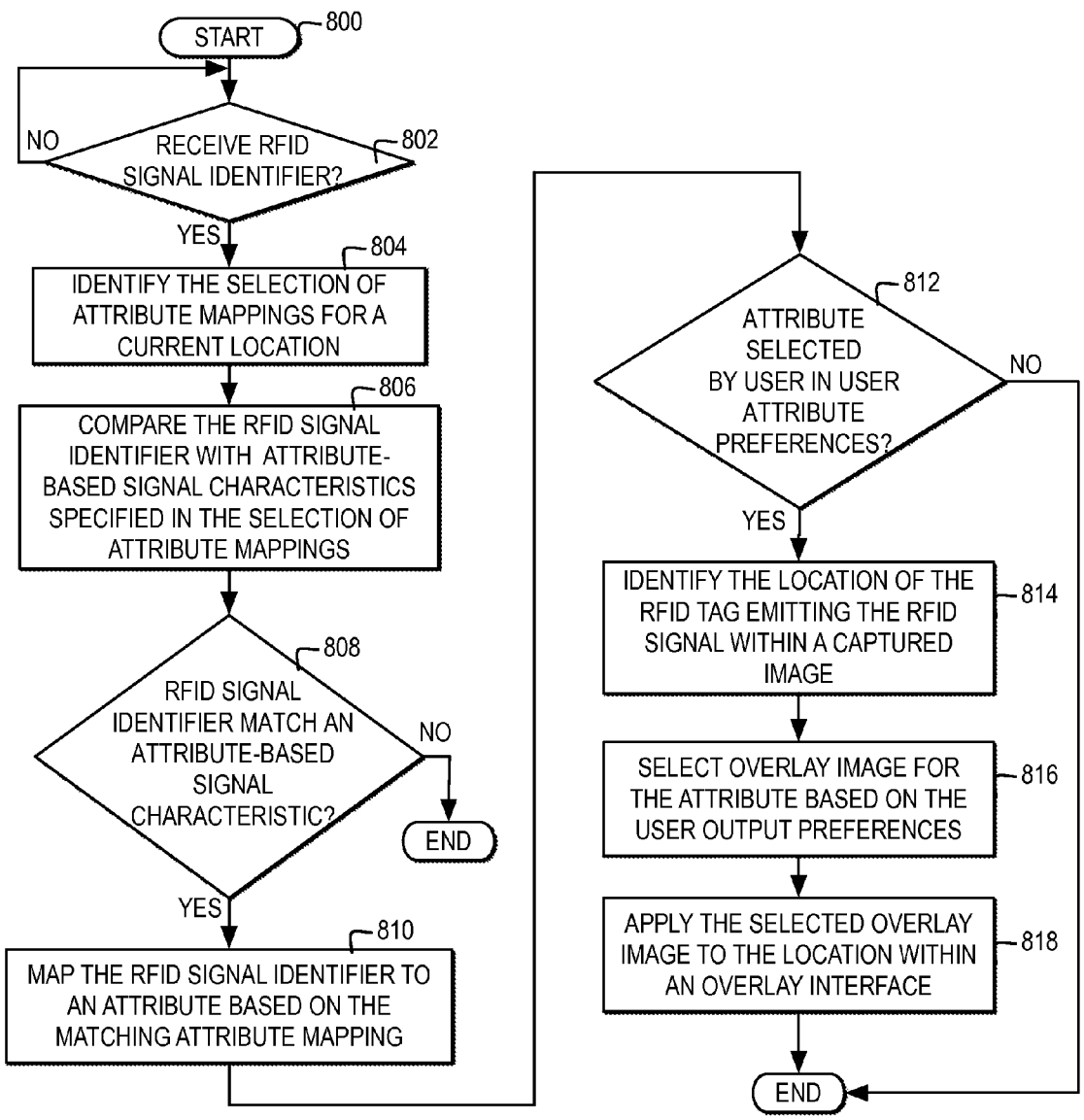
FIG. 8 is a high level logic flowchart depicts a process and program for identifying and visualizing attributes of items based on the proximity of attribute-based RFID signals to the items.

In one embodiment, the operations performed by processor 412 may control the operations of flowchart of FIG. 8 and other operations described herein. Operations performed by processor 412 may be requested by software, such as operating system 460 and application software 470, or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 418, a random access memory (RAM), such as RAM 414, a read-only memory (ROM) 416, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 400, partly on the user's computer, as a stand-alone software package, partly on the user's computer and partly on a remote computer or entirely on the remote computer or server. In the latter scenario, the remote computer may be connected to the user's computer through any type of network, such as network 302, through a communication interface, such as network interface 432, over a network link that may be connected, for example, to network 302.

In the example, network interface 432 includes an adapter 434 for connecting computer system 400 to network 302 through a link. Although not depicted, network interface 432 may include additional software, such as device drivers, additional hardware and other controllers that enable communication. When implemented as a server, computer system 400 may include multiple communication interfaces accessible via multiple peripheral component interconnect (PCI) bus bridges connected to an input/output controller, for example. In this manner, computer system 400 allows connections to multiple clients via multiple separate ports and each port may also support multiple connections to multiple clients.

One embodiment of the invention is described herein with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 400, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 400, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 432, the network link to network 302, and network 302 may use electrical, electromagnetic, or optical signals that carry digital data streams. The signals through the various networks and the signals on network 302, the network link to network 302, and network interface 432 which carry the digital data to and from computer system 400, may be forms of carrier waves transporting the information.

In addition, computer system 400 may include multiple peripheral components that facilitate input and output. These peripheral components are connected to multiple controllers, adapters, and expansion slots, such as input/output (I/O) interface 426, coupled to one of the multiple levels of bus 422. For example, input device 424 may include, for example, a microphone, a video capture device, an image scanning system, a keyboard, a mouse, or other input peripheral device, communicatively enabled on bus 422 via I/O interface 426 controlling inputs. In addition, for example, output device 420 communicatively enabled on bus 422 via I/O interface 426 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 4 may vary. Furthermore, those of ordinary skill in the art will appreciate that the depicted example is not meant to imply architectural limitations with respect to the present invention.

Figure 5:
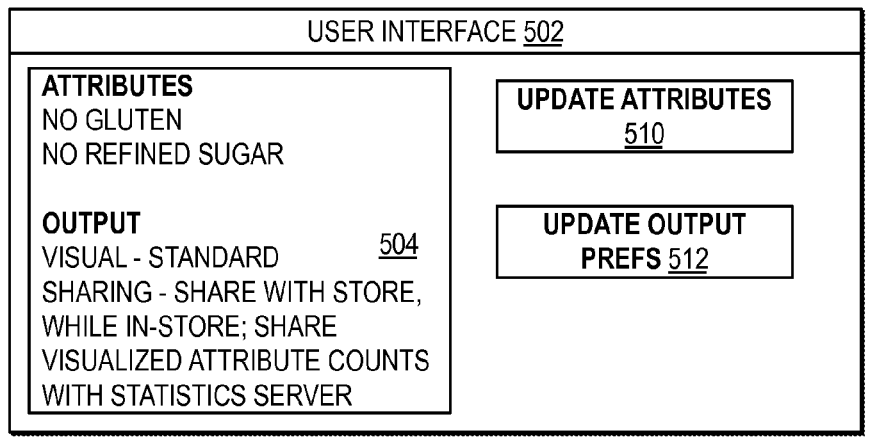
FIG. 5 is a block diagram illustrating one example of a user interface for selecting user attribute preferences and user output preferences.

Referring now to FIG. 5, a block diagram illustrates one example of a user interface for selecting user attribute preferences and user output preferences. In the example, user interface 502 illustrates current user preferences 504. In the example, current user preferences 504 includes user attribute preferences of "no gluten" and "no refined sugar" and user output preferences, including a visual output preference of "standard" and a sharing preference of "share with store, while in-store" and "share visualized attribute counts with statistics server".

A store may broadcast attribute mappings 124 or an identifier for accessing attribute mappings 124, such as from store server 312, where the broadcast is detectable by portable devices of users within the store. The attribute preferences listed in current user preferences 504 may be graphically adjusted, dynamically, to reflect a selection of attributes from among the current user preferences that are available in a particular store, as indicated by the attribute markings provided by the store. For example, if attribute mappings 124 for a particular store include an attribute of "no gluten", but do not include an attribute of "no refined sugar", then "no gluten" within current user preferences 504, may be graphically distinguished from "no refined sugar", to graphically indicate that the "no gluten" attribute is mapped to with the current settings for attribute mappings 124 and that the "no refined sugar" attribute is not mapped to within the current settings for attribute mappings 124.

In addition, user interface 502 includes multiple selectable options for updating current user preferences 504 including a selectable option 510 to update the attributes selected and a selectable option 512 to update the output preferences selected.

Responsive to a user selection of update attributes 510, the user may be provided with a selectable list of available attributes specified within attribute mappings 124. In addition, through a user selection of update attributes 510, the user may be provided with an interface through which the user enters the name or other identifier of an attribute the user would like to be marked in the store, where the user's entered attribute is shared according to the user's sharing preferences with store server 312, attribute statistics server 320, and other systems.

Responsive to a user selection of update output prefs 512, the user may be provided with a selectable list of output types for visualizing attributes. In addition, responsive to a user selection of update output prefs 512, the user may be provide with a selectable list of entities with whom to select to share attribute-based usage data. In the example, the user has selected to share attribute preferences with the store, which permits the user's portable device to communicate attribute preferences to store server 312 through a local network while the user is in the store, for example. In addition, in the example, the user has selected to share attribute counts, meaning the number of times that a particular attribute is mapped to during a session, with statistics server 320, for example. A user may further specify a particular statistics server, a particular store, or other criteria for controlling sharing of attribute-based usage data.

Figure 6:
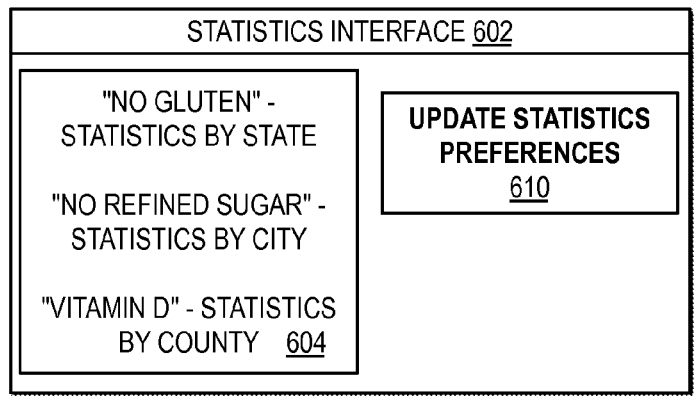
FIG. 6 is a block diagram illustrating one example of a statistics interface for selecting user attribute statistics reporting preferences.

With reference now to FIG. 6, a block diagram illustrates one example of a statistics interface for selecting user attribute statistics reporting preferences. In the example, a statistics interface 602 includes current statistics preferences 604 for an entity requesting attribute statistics reports and a selectable option 610 for the entity to update statistics preferences. A server that collects attribute-based usage data from multiple portable devices, such as attribute statistics server 320, may provide statistics interface 602 and filter collected data according to the filtering preferences selected by an entity. In the example, the entity has selected current statistics preferences 604 specifying a report of "no gluten" attribute statistics by state, "no refined sugar" attribute statistics by city and "vitamin D" attribute statistics by county. Based on an entity's current statistics preferences attribute statistics server 320 adjusts the statistics reported to the entity from the attribute preferences and other attribute-based usage data collected by attribute statistics server 320 from multiple portable devices and store servers.

Figure 7:
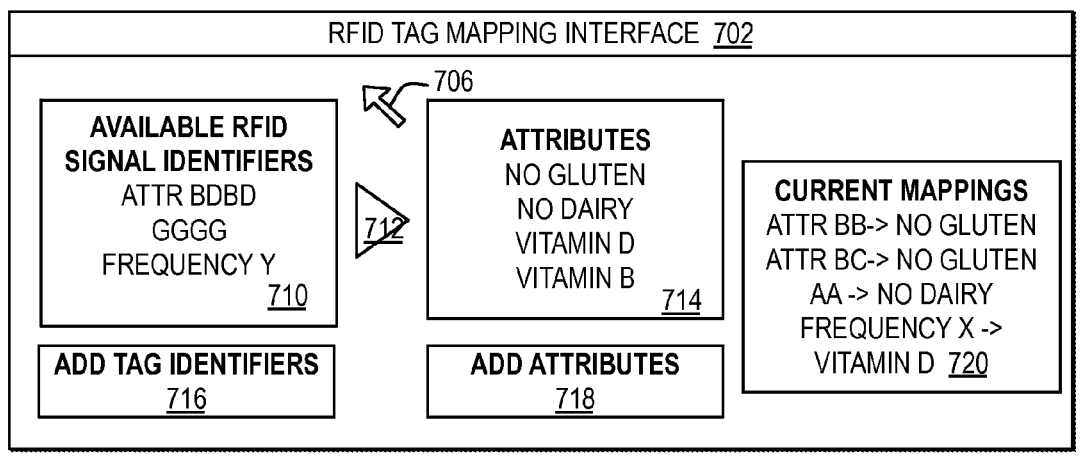
FIG. 7 is a block diagram illustrating one example of an RFID tag mapping interface for selecting attribute-based signal characteristics and for mapping attribute-based identifiers to attributes.

Referring now to FIG. 7, a block diagram depicts one example of an RFID tag mapping interface for selecting attribute-based identifiers and for mapping attribute-based identifiers to attributes. In the example, an RFID tag mapping interface 702 displays a list of available RFID signal identifiers 710 available for selection as attribute-based identifiers, a list of current attributes to map to 714, and a list of current mappings 720, in addition to displaying a selectable option 716 to add tag identifiers to list 710, a selectable option 718 to add attributes to list 714 and a selectable option 712 to map identifiers selected from list 710 to an attribute selected from list 714, to add to current mappings list 720. In one example, a user may select from among lists 710 and 714 and may select from among selectable options 716, 712, and 718 by positioning and selecting using pointer 706, or through other input devices.

In the example, list 710 includes the RFID signal identifier of data or frequencies read from signals from RFID tags available for placement as attribute-based RFID tags. RFID tags may include data that includes an attribute-based signal characteristic, such as "ATTR", and a separate identifier, such as "BDBD". In addition, RFID tags may include data that is not uniquely identified as attribute data, such as "GGGG", but once mapped to an attribute in current mappings 720, "GGGG" is an attribute-based identifier that specifies an attribute-based signal characteristic and an identifier that maps to an attribute. Further, RFID signal identifiers may include a frequency that may be identified as an attribute-based identifier, such as "frequency Y".

In the current mappings list 720, the mappings are illustrated with attribute-based identifiers "ATTR BB" and "ATTR BC" both mapped to the attribute of "no gluten". Multiple attribute-based identifiers may be mapped to a same attribute.

In addition, in the example, in current mappings list 720, the mappings are illustrated with the attribute-based identifier "AA" mapped to the attribute of "no dairy". In one example, a store may purchase multiple RFID tags with the RFID signal identifier "AA" output from each tag, where the store maps the RFID tags to an attribute to use the RFID tags as attribute-based, item-independent RFID tags.

In addition, in the example, in current mappings list 720, the mappings are illustrated with the attribute-based identifier frequency of "frequency X" mapped to the attribute of "vitamin D". In one example, multiple RFID tags may be set to a particular frequency for mapping to a particular attribute.

In the example, current mappings 720 includes attribute-based identifiers "ATTR BB", "ATTR BC", "AA", and "frequency X". In the example, the attribute-based signal characteristics are "ATTR", "AA", and "frequency X", where "ATTR" is specified as a standard attribute-based signal characteristic and "AA" and "frequency X" are attribute-based signal characteristics because they are mapped to in current mappings 720. Once an RFID signal identifier is identified as having one of the attribute-based signal characteristics in current mappings 720, the attribute mapped to the particular attribute-based identifier in the RFID signal identifier is identified from current mappings 720.

With reference now to FIG. 8, a high level logic flowchart depicts a process and program for identifying and visualizing attributes of items based on the proximity of attribute-based RFID signals to the items. In the example, the process and program starts at block 800 and thereafter proceeds to block 802. Block 802 illustrates a determination whether an RFID signal identifier is received. The RFID signal identifier may include a frequency of the signal and data digitized from the signal by an RFID reader. At block 802, if an RFID signal identifier is received, then the process passes to block 804.

Block 804 illustrates identifying a selection of attribute mappings for a current location from among the attribute mappings. Next, block 806 depicts comparing the RFID signal identifier with attribute-based signal characteristics in the selection of attribute mappings. Thereafter, block 808 illustrates a determination whether the RFID signal identifier matches an attribute-based signal characteristic. At block 808, if the RFID signal identifier does not match an attribute-based signal characteristic, then the process ends. At block 808, if the RFID signal identifier does match an attribute-based signal characteristic, then the process passes to block 810.

Block 810 illustrates mapping the RFID signal identifier to a particular attribute based on the matching attribute mapping. Next, block 812 depicts a determination whether the identified attribute is specified in the user attribute preferences. At block 812, if the identified attribute is not specified in the user attribute preferences, then the process ends. At block 812, if the identified attribute is specified in the user attribute preferences, then the process passes to block 814.

Block 814 depicts identifying the location of the RFID tag emitting the RFID signal within a captured image. Next, block 816 illustrates selecting an overlay image for the attribute based on the user output preferences for the attribute. Thereafter, block 818 illustrates applying the selected overlay image to the location within an overlay interface, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for identifying items comprising:
receiving, by a computer system, a particular RFID signal identifying that a particular attribute is associated with a particular item placed proximate to an RFID tag emitting the particular RFID signal, wherein the particular RFID signal is identified from among a plurality of RFID signals, wherein a selection of the plurality of RFID signals are each associated with a separate attribute from among a plurality of attributes, by:
identifying an RFID signal identifier from the particular RFID signal;
comparing the RFID signal identifier with at least one attribute-based signal characteristic; and
responsive to the RFID signal identifier matching the at least one attribute-based signal characteristic, identifying a particular attribute mapping from among a selection of attribute mappings that maps the RFID signal identifier to the particular attribute; and
displaying, by the computer system, a visual representation depicting that the particular item is associated with the particular attribute.

2. The method according to claim 1, wherein receiving, by a computer system, a particular RFID signal identifying that a particular attribute is associated with a particular item placed proximate to the RFID tag emitting the particular RFID signal, wherein the particular RFID signal is identified from among a plurality of RFID signals, wherein a selection of the plurality of RFID signals are each associated with a separate attribute from among a plurality of attributes, further comprises:
receiving the particular RFID signal identifying that the particular attribute is associated with the particular item, wherein the particular attribute indicates an absence of a type of ingredient.

3. The method according to claim 1, further comprising:
identifying a current location of the computer system; and
selecting the selection of attribute mappings specified for the current location from among a plurality of attribute mappings specified for a plurality of locations.

4. The method according to claim 1,
wherein identifying the RFID signal identifier from the particular RFID signal further comprises identifying a particular frequency of the particular RFID signal; and wherein comparing the RFID signal identifier with the at least one attribute-based signal characteristic further comprises identifying the particular frequency as matching at least one frequency specified as the at least one attribute-based signal characteristic.

5. The method according to claim 1,
wherein identifying the RFID signal identifier from the particular RFID signal further comprises identifying a selection of data from the particular RFID signal; and
wherein comparing the RFID signal identifier with the at least one attribute-based signal characteristic further comprises identifying the selection of data as matching at least one data identifier specified as the at least one attribute-based signal characteristic.

6. The method according to claim 1, wherein displaying, by the computer system, a visual representation depicting that the particular item is associated with the particular attribute, further comprises:
responsive to determining that the particular attribute is selected by a user in a selection of user attribute preferences, identifying a location of the RFID tag emitting the RFID signal;
selecting an overlay image for the particular attribute;
accessing an image of a current view captured by an image capture device;
identifying the location of the RFID tag within the current view; and
applying the selected overlay image to the location within an overlay interface.

7. The method according to claim 6, wherein applying the selected overlay image to the location within the overlay interface further comprises:
applying the selected overlay image to the location within a display interface through which a user views an image of the current view captured through the image capture device.

8. The method according to claim 1, further comprising:
tracking a number of times the particular attribute is identified from one or more RFID signals; and
sharing the number of times the particular attribute is identified, with an entity.

9. The method according to claim 1, further comprising:
receiving, by the computer system, a second RFID signal identifying that a second attribute from among the plurality of attributes is associated with the particular item placed proximate to the RFID tag emitting the second RFID signal; and
displaying, by the computer system, the visual representation depicting that the particular item is associated with the particular attribute and the second attribute.

10. A system for identifying items comprising:
a computer system operative to receive a particular RFID signal identifying that a particular attribute is associated with a particular item placed proximate to an RFID tag emitting the particular RFID signal, wherein the particular RFID signal is identified from among a plurality of RFID signals, wherein a selection of the plurality of RFID signals are each associated with a separate attribute from among a plurality of attributes;
the computer system operative to identify an RFID signal identifier from the particular RFID signal;
the computer system operative to compare the RFID signal identifier with at least one attribute-based signal characteristic;
the computer system responsive to the RFID signal identifier matching the at least one attribute-based signal characteristic, operative to identify a particular attribute mapping from among a selection of attribute mappings that maps the RFID signal identifier to the particular attribute; and
the computer system operative to display a visual representation depicting that the particular item is associated with the particular attribute.

11. The system according to claim 10, wherein the particular attribute indicates an absence of a type of ingredient.

12. The system according to claim 10, further comprising:
the computer system operative to identify a current location of the computer system; and
the computer system operative to select the selection of attribute mappings specified for the current location from among a plurality of attribute mappings specified for a plurality of locations.

13. The system according to claim 10,
wherein the computer system operative to identify the RFID signal identifier from the particular RFID signal further comprises the computer system operative to identify a particular frequency of the particular RFID signal; and
wherein the computer system operative to compare the RFID signal identifier with the at least one attribute-based signal characteristic further comprises the computer system operative to identify the particular frequency as matching at least one frequency specified as the at least one attribute-based signal characteristic.

14. The system according to claim 10,
wherein the computer system operative to identify the RFID signal identifier from the particular RFID signal further comprises the computer system operative to identify a selection of data from the particular RFID signal; and
wherein the computer system operative to compare the RFID signal identifier with the at least one attribute-based signal characteristic further comprises the computer system operative to identify the selection of data as matching at least one data identifier specified as the at least one attribute-based signal characteristic.

15. The system according to claim 10, wherein the computer system operative to display a visual representation depicting that the particular item is associated with the particular attribute, further comprises:
the computer system, responsive to determining that the particular attribute is selected by a user in a selection of user attribute preferences, operative to identify a location of the RFID tag emitting the RFID signal;
the computer system operative to select an overlay image for the particular attribute;
the computer system operative to access an image of a current view captured by an image capture device;
the computer system operative to identify the location of the RFID tag within the current view; and
the computer system operative to apply the selected overlay image to the location within an overlay interface.

16. The system according to claim 15, wherein the computer system operative to apply the selected overlay image to the location within the overlay interface further comprises:
the computer system operative to apply the selected overlay image to the location within a display interface through which a user views an image of the current view captured through the image capture device.

17. The system according to claim 10, further comprising:
the computer system operative to track a number of times the particular attribute is identified from one or more RFID signals; and the computer system operative to share the number of times the particular attribute is identified, with an entity.

18. A computer program product for identifying items, the computer program product comprising a tangible computer-readable storage medium having program code embodied therewith, the program code executable by a computer to:

receive, by a computer, a particular RFID signal identifying that a particular attribute is associated with a particular item placed proximate to an RFID tag emitting the particular RFID signal, wherein the particular RFID signal is identified from among a plurality of RFID signals, wherein a selection of the plurality of RFID signals are each associated with a separate attribute from among a plurality of attributes;

identify, by the computer, an RFID signal identifier from the particular RFID signal;

compare, by the computer, the RFID signal identifier with at least one attribute-based signal characteristic;

responsive to the RFID signal identifier matching the at least one attribute-based signal characteristic, identify, by the computer, a particular attribute mapping from among a selection of attribute mappings that maps the RFID signal identifier to the particular attribute; and display, by the computer, a visual representation depicting that the particular item is associated with the particular attribute.

* * * * *